Feb. 20, 1973  M. J. FREIJE  3,716,914
WIRE CUTTER AND STRIPPER

Filed July 22, 1971  2 Sheets-Sheet 1

INVENTOR,
Michell J. Freije
BY Robert A. Spray
ATTORNEY

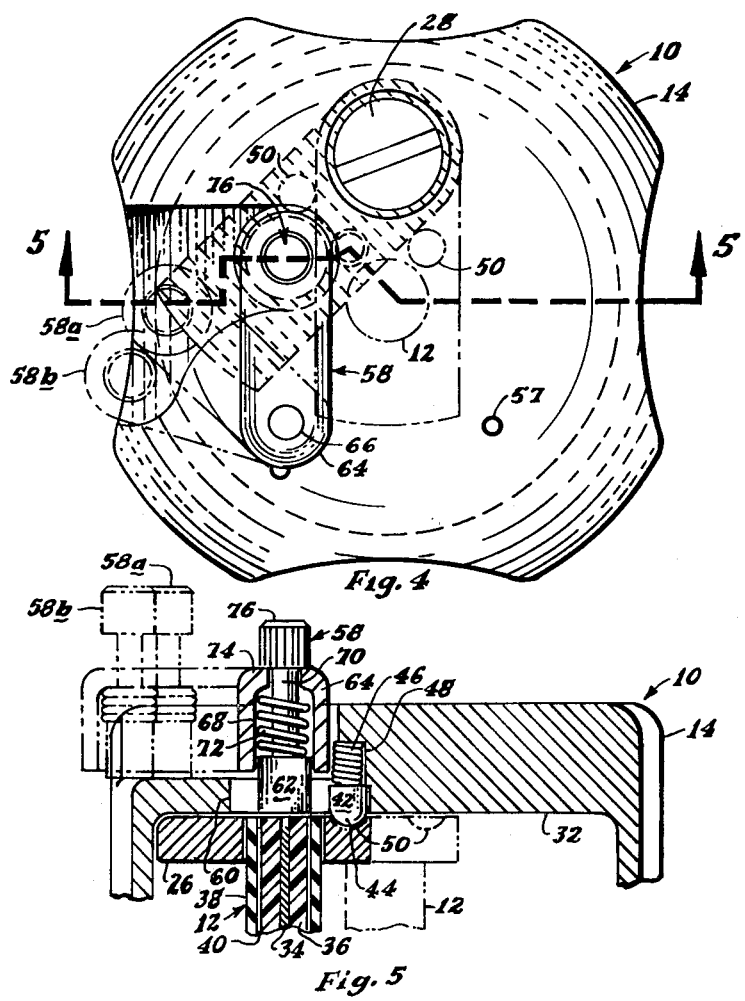

United States Patent Office 3,716,914
Patented Feb. 20, 1973

3,716,914
WIRE CUTTER AND STRIPPER
Michell J. Freije, R.R. 2, P.O. Box 323C,
Carmel, Ind. 46032
Filed July 22, 1971, Ser. No. 165,003
Int. Cl. H02g 1/12
U.S. Cl. 30—90.1                                    15 Claims

ABSTRACT OF THE DISCLOSURE

An easily-operated hand tool, particularly useful in cutting and stripping coaxial cable. In a single operation, it cuts and strips the insulations and the internal wire braid or mesh from coaxial cable at any desired length pattern; that is, it cuts the outer insulation and the wire braid or mesh at one length from the cable-end, and cuts those components and the inner insulation at a lesser length from the cable-end, leaving a free non-insulated remote end of the inner cable wire, with an adjacent portion of insulation-coated inner cable wire which has just the outer insulation and the wire braid or mesh removed.

---

This invention relates to a hand tool by which the outer layer or layers of insulation and shielding wires may be conveniently cut and stripped from the end of coaxial cable; and the concepts provide that a staggered overall pattern of cutting and stripping may be conveniently and readily made, in a single overall cutting operation.

That is, layers of the cable relatively far from the wire end may be cut and stripped to only a relatively large diameter, while the layers thereof closer to the end of the cable are simultaneously being cut and stripped to a relatively small diameter.

The time-saving and labor saving and scrap-eliminating convenience of such a tool, particularly in being able to neatly cut and strip at two or more depths along the wire simultaneously, the cuts being at two or more locations along the wire, is of course obvious.

In carrying out the invention in an embodiment to illustrate the inventive concepts, relatively rotatable means are provided, one of which carries cutter blade means and the other of which supports the cable during the cutting operation, all in a combination which provides a plurality of adjustable cutter blade means and provides other features of handiness and convenience.

These are described in detail in the following detailed description of an illustrative embodiment, reference being had to the accompanying somewhat schematic drawings, in which:

FIG. 4 is an exterior view of the body member at one end of the device shown in FIGS. 1 and 2; and FIG. 5 is a cross-sectional detail view, taken generally as indicated by section-line 5—5 of FIG. 4.

Figure 1:
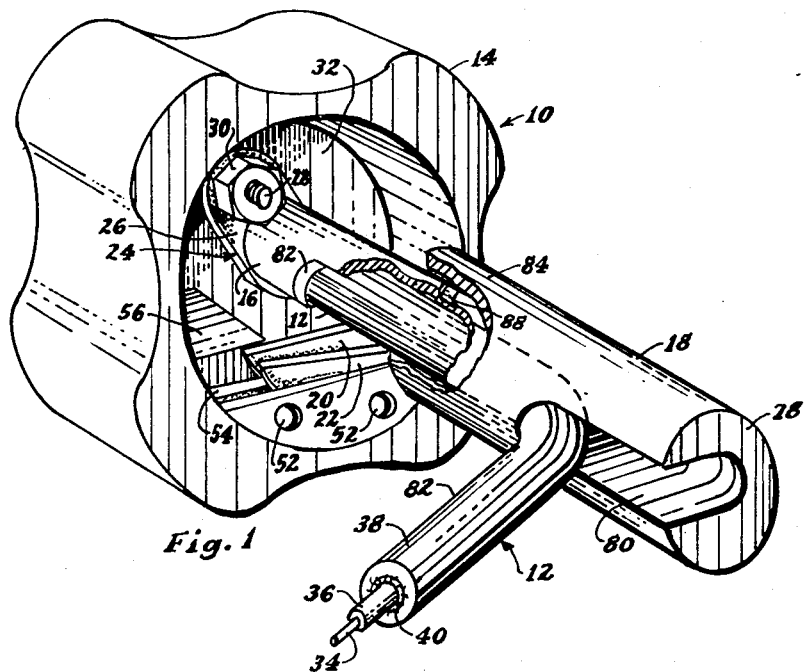
FIG. 1 is a pictorial view of the hand tool, with a piece of coaxial cable in place ready for cutting and stripping, but with the parts being positioned in a non-cutting position.

As shown in the drawings, a hand tool 10, particularly adapted for the cutting and stripping of an associated work-piece of coaxial cable 12, is illustrated as having as general components a body member 14, a carrier member 16, and a support member 18.

These and the other components are interrelated as described below, and provide a convienient means for cutting and stripping an end of the cable 12.

A plurality of cutter blades 20 and 22 are shown adjustably mounted on the body member 14; and, as described below, the relative rotatability of the carrier member 16 and support member 18, and the movable interconnecting means 24 which interconnects the carrier member 16 with body member 14, achieves a cutting and stripping of the cable 12 as now described.

The interconnecting means 24 is shown as an arm 26 fixedly connected to an end of the carrier member 16, and another end of the arm 26 is pivoted as by a bolt 28 (having a holding nut 30) to an interior wall 32 of the body member 14.

Figure 2:
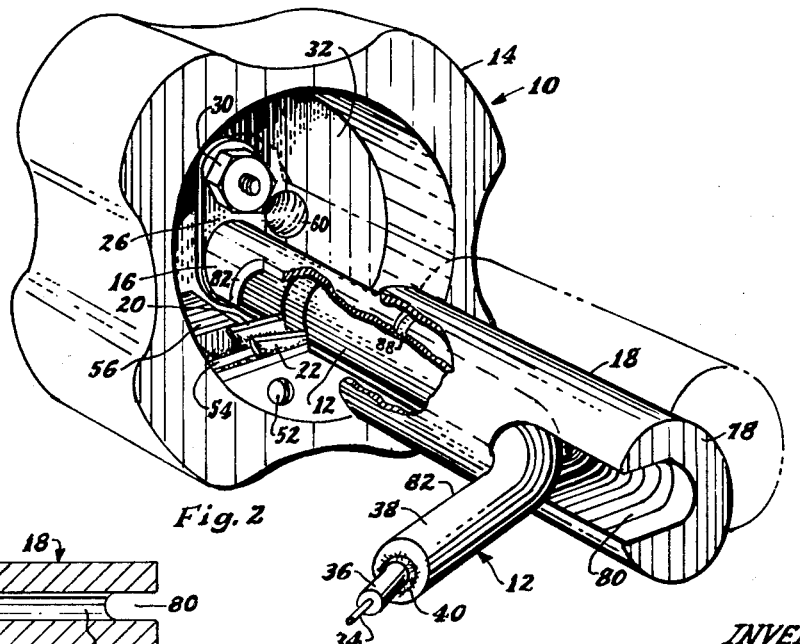
FIG. 2 is a pictorial view similar to FIG. 1, but with the parts arranged in a cutting position, and with cuts having already been made to the cable being worked upon as an illustrative work-object.
Figure 3:
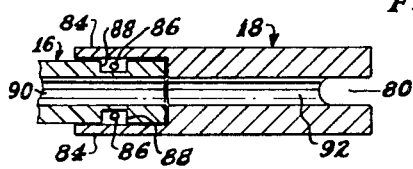
FIG. 3 is a longitudinal cross-sectional view of a portion of a carrier and a support member of the embodiment shown in FIGS. 1 and 2.

This arm 26 supportingly interconnects the carrier member 16 and said body member 14 and permits relative movement thereof in and between what might be described as a first (non-cutting) relative position (FIG. 1) and a second relative position (FIG. 2) for cutting.

In the said first relative position (FIG. 1), the said carrier member 16 is disposed in a position of relative remoteness to the cutter blade means 20–22, providing that the associated cable 12 or work object may be moved, without operatively encountering the cutter blade means 20–22, into supporting reception by said carrier member 16 in a position with respect to the carrier member such that the end-portion of the work object 12 lies across or past the plane of the blades 20–22. That is, it lies on a second side of said cutter blade means 20–22 which is opposite the first side thereof on which lies the portion of the cable 12 not to be stripped; and this provides for cutting and stripping as subsequently described.

In the said second relative position (FIG. 2) the said carrier member 16 is disposed in a position of relative proximity to a portion of said cutter blade means 20–22. The proximity in this respect is such that the outer surface of the central wire 34 of cable 12 received in the carrier member 16 operatively extends radially outwardly to the cutter blade 20 when the carrier member 16 and the body member 14 are in the said second relative position; and, simultaneously, the outer surface of the insulation layer 36 adjacently surrounding the central wire 34 operatively extends radially outwardly to the cutter blade 22.

Thus, after the parts are moved to the said second relative position (FIG. 2), subsequent relative rotation of said body member 14 with respect to said support member 18 (subsequent to the relative movement of the said carrier member 16 and said body member 14 from said first relative position into said second relative position, with the work object 12 being held relatively fixed to the support member 18) is operative to present the cutter blade means 20–22 operatively forcefully against the outer portions of the said cable 12 and thereby cut the said outer portions thereof to a radial depth related to the said relative proximity and leave uncut the central portion of the said work object.

More particularly in the embodiment shown, with a plurality of said cutter blade means 20–22 being provided, spaced one from the other, and operatively fixed to said body member 14 in a staggered radial relationship, with respect to the operative axis of said carrier member 16 when the said carrier member 16 and said body member 14 are in said second relative position, the relationship of parts is such that the proximity (to the carrier member 16) of the cutter blade 22 relatively farther away from the end of cable 12 to be stripped, is more remote than is the said proximity of the cutter blade 20 relatively closer to the end of the cable 12 to be stripped.

This provides, with the work object 12 being coaxial cable as shown, that the proximity of said relatively farther away cutter blade 22 is such that said subsequent relative rotation (of body member 14 with respect to support member 18) will cut just through the outermost insulation layer 38 and the layer of braid or mesh 40 thereof, leaving unsevered more central portions (wire 34 and inner insulation 36) of the cable 12, and the proximity of the said relatively closer cutter blade 20 is such that said subsequent relative rotation of body member 14 with respect to support member 18 will cut just through the inner insulation layer 36 between the said braid or mesh 40 and the inner central wire 34 of said cable 12, but leaving said central wire 34 unsevered.

Ease of forcing the parts from the first position (FIG. 1) to the second position (FIG. 2) and consequent ease of forcing the cable into the initial cut is provided by the said interconnecting means 24, which movably interconnects the said carrier member 16 and the said body member 14, being such as to cause the relative movement, from said first relative position to said second relative position, to bring the cable 12 carried in said carrier means 16 toward the said cutter blade means 20–22 along a path having substantially less angle than perpendicularly to said cutter blade means. This slides the cable 12 against the cutters 20–22, rather than pushing it directly against the cutters.

More particularly, in the form shown, the interconnecting means 24 rotatably interconnects the carrier member 16 and body member 14 on an axis substantially removed from the operative axis of the said carrier member 16; and the interconnecting means 24 also provides that the operative axis of the said carrier member, in its movement from said first relative position to said second relative position, moves, with respect to the said body member 14, in a path which in the region of said second relative position is effectively tangent to a line parallel to said cutter blade means 20–22 in said region.

Detent means 42 (FIG. 5) are provided for releasably retaining the said carrier member 16 and the said body member 14 in either said first relative position or said second relative position. As shown, this includes a latching plunger 44 biased by a spring 46, in a pocket or recess 48 of wall 32 of body member 14, and engageable into either of two recesses 50 of an adjacent face of the arm 26 of interconnecting means 24, those recesses 50 being located such that (in combination with the location of the plunger 44) they selectively locate the arm 26 to retain either of the said relative positions.

(The arm 26, being fixed to the carrier member 16, is in effect part of the carrier member in the sense of its co-operation with the body member 14.)

Adjustable means are provided for selectively mounting the said cutter blades 20–22 onto the body member 14 to provide whatever amount of proximity is desired, corresponding to the diameter of the wire 34 or central core member of the work-object, desired to be left unsevered. That is, in the form shown, the blades 20–22 are adjustably held by screws 52 which pass through interchangeable or replaceable spacers 54 and 56 and into threaded openings 57 in body member 14.

The length of the stripped end of the cable 12 is adjustably provided by the thickness used for the end spacer 56, which lies between the end blade 20 and an abutment means 58 (FIG. 5) for fixing the length of work object which can lie on what is referred to above as the second side of the cutter blade means 20–22, that is the side facing the end of the cable 12.

The abutment means 58 is movable, from and between the cable-abutting full-line position as shown in FIGS. 4 and 5 and the retracted chain-line positions 58a and 58b shown in those FIGS. 4 and 5, the withdrawability to the chain line positions permitting the opening 60, through which a plunger body 62 of abutment means 58 extends through wall 32 of body member 14, to serve as a convenient outlet opening through which severed cable end pieces may be removed from the tool.

Other details of the abutment means 58, as shown, are that it includes a movable arm member 64 pinned as by a pin 66 to the wall 32 of body member 14; and the arm 64 has a hollow portion 68 through which extends a plunger shaft 70 which carries the plunger body 62, with a compression spring 72 surrounding plunger shaft 70 and disposed between the plunger body 62 and outer wall 74 of the arm 64.

A manually graspable head 76 is fixed to the shaft 70, and itself provides an abutment engageable with the wall portion 74 to limit inward travel of the plunger body 62 to be just flush with the inner wall 32 of body member 14. That flush position is urged by the spring 72; but the outward withdrawal of plunger shaft 70 and body 62, against the bias of spring 72, permits the plunger body 62 to clear the wall 32 of body member 14 accommodating the withdrawal of the plunger body 62 from the cable-abutting position.

Retention of the cable 12 in a relatively fixed position during relative rotation of the body member 14 (and its cutter blades 20–22), is shown as follows. The support member 18 is provided at its end 78 which is remote from the carrier member 16 and body member 14, with a receiver means 80 extending laterally with respect to the operative axis of the carrier member 16 and the axis of rotatable interconnection of the support member 18 and the carrier member 16, the receiver means 80 providing a means receiving a portion 82 of the cable 12 which is out-turned and thus non-concentric with said other axes and thus restraining said cable 12 against rotation with respect to said support member 18 during the cutting operation achieved during the relative rotation of the body member 14 with respect to said support member 18.

More particularly as shown, the receiver means 80 is a recess in a wall of said support member 18 and opening to the end 78 thereof remote from the carrier member 16 and body member 14.

The carrier member 16 and support member 18 are shown as generally cylindrical hollow members. The carrier member 16 is provided with a clearance opening 82 in the axial region of the cutters 20–22 to permit the cable 12 carried in carrier 16 to engage the cutters 20–22 in the cutting (full lines in FIG. 2) position; and supportive relative rotation of carrier 16 and support member 18 is shown as by the support member 18 having a portion 84 concentrically disposed about an end portion of the carrier 16, pins 86 extending in chord-like manner between opposite faces of support-portion 84 and in a peripheral groove 88 in the outer surface of the carrier member 16. The bores 90 and 92 of the carrier member 16 and support member 18, respectively, are shown as of the same diameter, just slightly larger (for free clearance) than the diameter of the cable 12.

The manipulation of the tool is quite easy and convenient, once the device is seen, and requires no particular degree of skill or mechanical aptitude. The user pushes the cable 12 through the bores 92 and 90 of support member 18 and carrier 16, to abut the extreme end of the cable 12 against the face of plunger 62. Then the carrier 16 and support sleeves 18 are pushed relative to the body member 14 from the remote (FIG. 1) position to the cutter-proximate (FIG. 2) position; and the cable portion is bent out the recess 80. The body member 14 and the support member 18 are relatively rotated.

Even the adjustability (by screws 52) of either or both of cutting depth and/or cutting length is substantially self-obvious, once the device and its operation is observed, and one or more shims may be obviously added or interchanged with the spacers 54 and 56. It is also obvious, once the device concepts are seen, to add one or more extra cutter blades with corresponding extra spacers, to modify the device so as to simultaneously achieve three or more staggered cuts to achieve co-axial stripping of a nature to leave three or more different diameter end portions.

Stripping the severed end pieces is achieved easily, and substantially automatically; for as the cable 12 is withdrawn from the device 10 with the carrier and support assembly 16–18 still in its cutter-proximate (FIG. 2) position with respect to the body member 14, the side faces of the cutter blades 20–22 themselves (or their supports or spacer portions carried close to the cutting edge of the cutter blades) block against the withdrawal of the cable portions on the afore-mentioned second side of the cutter blades; thus pulling the cable 12 outwardly of the device (rightwardly in FIG. 2) cause the severed end portions to remain in the carrier 16, on the said second side of the cutter blades.

Then, returning the carrier and support assembly 16–18 to its cutter-remote (FIG. 1) position brings the carrier 16 again into general co-axial adjacency to the opening 60 of the body-member 14. Whereupon, outward releasing or pulling on the plunger or abutment assembly 58 (with its parts 62, 70, 76), and movement thereof from the full lines position to the retracted chain-lines position (FIGS. 4 and 5) permits those severed cable-end portions to be shaken outwardly of the tool 10 through opening 60.

In this first or cutter-remote position (FIG. 1), and with the plunger assembly 58 returned to its full-line cable-end abutting position (full lines, FIG. 5), the device 10 is now ready for an operation of cutting and stripping another work object cable 12.

It is thus seen that a cutter and stripper tool provides novel and advantageous concepts and features of construction and operation.

Accordingly, it will thus be seen from the foregoing description of the invention according to this illustration embodiment, considered with the accompanying drawings, that the present invention provides a new and useful cutter and stripper tool, having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific form or arrangement of parts herein described or shown.

What is claimed is:

1. A tool for cutting and stripping of matter concentrically disposed around a central core member of the object being worked comprising, in combination:
   a carrier member, and a support member rotatably interconnected to said carrier member;
   a body member having cutter blade means operatively fixed thereto; and
   interconnecting means, supportingly interconnecting tthe carrier member and said body member and permitting relative movement thereof in and between a first relative position and a second relative position,
   the said second relative position being such that the said carrier member is disposed in a position of relative proximity to a portion of said cutter blade means, the proximity being such that the outer surface of the said central core member of the work object received in the carrier member operatively extends radially outwardly to the said cutter blade means when the carrier member and the body member are in said second relative position;
   the said first relative position being such that the said carrier member is disposed in a position of relative remoteness to said portion of said cutter blade means, providing that the associated work object being worked upon may be moved, without operatively encountering said cutter blade means, into supporting reception by said carrier member in a position with respect to the carrier member such that the end-portion of the work object to be stripped lies on a second side of said cutter blade means which is opposite the first side thereof on which lies the portion of the work object not to be stripped;
   the relative proximity of said carrier member to said portion of the cutter blade means, in said second relative position, and the relative rotatable interconnection of the support member and the carrier member, providing that relative rotation of said body member with respect to said support member, subsequent to the relative movement of the said carrier member and said body member from said first relative position into said second relative position, with the work object being held relatively fixed to the support member, is operative to present the cutter blade means operatively forcefully against the outer portions of the said work object and thereby cut the said outer portions thereof to a radial depth related to the said relative proximity and leave uncut the central core member of the said work object.

2. The invention as set forth in claim 1, in a combination in which a plurality of said cutter blade means are provided, spaced one from the other, and operatively fixed to said body member in a staggered radial relationship, with respect to the operative axis of said carrier member when the said carrier member and said body member are in said second relative position, such that the proximity, to the carrier member, of the cutter blade means relatively farther away from the work object end to be stripped, is more remote than is the said proximity of the cutter blade means relatively closer to the work object end to be stripped.

3. The invention as set forth in claim 2, in a combination in which the work object is coaxial cable, and the proximity of said relatively farther away cutter blade means is such that said subsequent relative rotation will cut just through the outer insulation and the layer of braid or mesh thereof, leaving unsevered more central portions of the cable, and the proximity of the said relatively closer cutter blade means is such that said subsequent relative rotation will cut just through the insulation disposed between the said braid or mesh and the inner central wire of said cable, leaving said central wire unsevered.

4. The invention as set forth in claim 1, in a combination in which the said interconnecting means, which movably interconnects the said carrier member and the said body member, is such as to cause the relative movement, from said first relative position to said second relative position, to bring the work object carried in said carrier means toward the said cutter blade means along a path having substantially less angle than perpendicularly to said cutter blade means.

5. The invention as set forth in claim 4, in a combination in which the said interconnecting means includes means rotatably interconnecting the carrier member and body member on an axis substantially removed from the operative axis of the said carrier member; and the interconnecting means also provides that the operative axis of the said carrier member, in its movement from said first relative position to said second relative position, moves, with respect to the said body member, in a path which in the region of said second relative position is effectively tangent to a line parallel to said cutter blade means in said region.

6. The invention as set forth in claim 1, in a combination in which detent means are provided for releasably retaining the said carrier member and the said body member in either said first relative position or said second relative position.

7. The invention as set forth in claim 6, in a combination in which the said detent means include co-operative recess means and spring-pressed latching means cooperatively carried on adjacent portions of the carrier member and the body member.

8. The invention as set forth in claim 1, in a combination in which adjustable means are provided for selectively mounting the said cutter blade means onto the said body member to provide whatever amount of said proximity is desired, corresponding to the diameter of the central core member desired to be left unsevered.

9. The invention as set forth in claim 1, in a combination in which the body member is provided with abutment means for fixing the length of work object which can lie on said second side of the cutter blade means.

10. The invention as set forth in claim 9, in a combination in which means are provided for adjustably fixing the spacing of said abutment means and said cutter blade means, thereby providing selective adjustability of the length of the unsevered central core member of the work object.

11. The invention as set forth in claim 10, in a combination in which said adjustable spacing-fixing means are means adjustably positioning said cutter blade means with respect to the said abutment means.

12. The invention as set forth in claim 1, in a combination in which the said support member is provided at its end which is remote from the said carrier member and body member, with a receiver means extending laterally with respect to the operative axis of the carrier member and the axis of rotatable interconnection of the support member and the carrier member, the receiver means providing a means receiving a portion of the work object which is non-concentric with said other axes and thus restraining said work object against rotation with respect to said support member during the cutting operation achieved during the said subsequent relative rotation of said body member with respect to said support member.

13. The invention as set forth in claim 12, in a combination in which the said receiver means is a recess in a wall of said support member and opening to the end thereof remote from the carrier member and body member.

14. The invention as set forth in claim 13, in a combination in which the said recess means accommodates an out-turned portion of coaxial cable being stripped in the aforesaid manipulation of said device, the end portion of said cable to be stripped being disposed in the said carrier member.

15. The invention as set forth in claim 1, in a combination in which the parts permit subsequent relative movement of the work object on said second side of the cutter blade means toward said first side thereof, said relative movement being operative to strip the severed end-portions of the said work object from the unsevered central core thereof.

References Cited
UNITED STATES PATENTS

| | | | |
|---|---|---|---|
| 893,132 | 7/1908 | Bork | 81—9.5 R |
| 3,161,088 | 12/1964 | Tolman | 81—9.5 R |

ROBERT C. RIORDON, Primary Examiner

R. V. PARKER, JR., Assistant Examiner